(12) United States Patent
    Marastoni (10) Patent No.: US 9,308,684 B2
(45) Date of Patent: Apr. 12, 2016

(54) APPARATUS FOR MANUFACTURING PLASTIC PREFORMS

(71) Applicant: SACMI IMOLA S.C., Imola (IT)

(72) Inventor: Daniele Marastoni, San Giovanni In Persiceto (IT)

(73) Assignee: SACMI IMOLA S.C. (IT)

( * ) Notice: Subject to any disclaimer, the term of this patent is extended or adjusted under 35 U.S.C. 154(b) by 0 days.

(21) Appl. No.: 14/386,426

(22) PCT Filed: Mar. 18, 2013

(86) PCT No.: PCT/IB2013/052147
§ 371 (c)(1),
(2) Date: Sep. 19, 2014

(87) PCT Pub. No.: WO2013/140326
PCT Pub. Date: Sep. 26, 2013

(65) Prior Publication Data
US 2015/0064295 A1    Mar. 5, 2015

(30) Foreign Application Priority Data
Mar. 19, 2012    (IT) ................ VR2012A0048

(51) Int. Cl.
*B29C 49/06* (2006.01)
*B29C 49/42* (2006.01)
*B29C 49/64* (2006.01)
*B29K 101/00* (2006.01)

(52) U.S. Cl.
CPC ............ *B29C 49/06* (2013.01); *B29C 49/4205* (2013.01); *B29C 49/6427* (2013.01); *B29C 49/6418* (2013.01); *B29K 2101/00* (2013.01)

(58) Field of Classification Search
CPC    B29C 49/06; B29C 49/4205; B29C 49/6427; B29C 49/6418
USPC .................................................. 425/534, 540
See application file for complete search history.

(56) References Cited

U.S. PATENT DOCUMENTS 7,004,302 B1    2/2006  Hensen
7,887,319 B2*   2/2011  Takatomi et al. ............. 425/526
(Continued)

FOREIGN PATENT DOCUMENTS

DE    102008055531 A1    6/2010
WO      2009109829 A1    9/2009

OTHER PUBLICATIONS

International Search Report for corresponding application PCT/IB2013/052147 filed Mar. 18, 2013; Mail date Aug. 30, 2013.
(Continued)

*Primary Examiner* — Robert B Davis
(74) *Attorney, Agent, or Firm* — Cantor Colburn LLP (57) ABSTRACT

An apparatus for manufacturing plastic preforms, comprising a rotating carousel forming device for plastic preforms and movement elements adapted to pick up the preforms from the rotating carousel forming device; the movement elements are associated with a supporting structure for a plurality of shaping receptacles, which are mutually spaced and movable along a transfer path, the shaping receptacles being adapted to receive a respective preform directly from the rotating carousel forming device and at an angular pick-up portion which is defined along the circular movement trajectory of the preforms on the rotating carousel forming device.

14 Claims, 8 Drawing Sheets

(56) References Cited

U.S. PATENT DOCUMENTS

2008/0166442 A1* 7/2008 Balboni et al. ............... 425/347
2009/0127076 A1   5/2009 Balboni

OTHER PUBLICATIONS

Written Opinion for corresponding application PCT/IB2013/052147 filed Mar. 18, 2013; Mail date Aug. 30, 2013.

* cited by examiner

APPARATUS FOR MANUFACTURING PLASTIC PREFORMS

The present invention relates to an apparatus for manufacturing plastic preforms.

Apparatuses for manufacturing plastic preforms are known which are constituted essentially by a device for forming plastic preforms and by movement means adapted to pick up the preforms from the forming device in order to supply them to a device for blow-molding the plastic preforms in order to obtain the containers.

With particular reference to apparatuses in which the forming device is constituted by a rotating carousel, the movement means usually comprise a pick-up carousel which has, at its peripheral region, a plurality of grip elements designed to pick up preforms from the rotating carousel forming device in order to transfer them to a cooling and transfer carousel.

Advantageously, said cooling and transfer carousel can be associated, at its peripheral region, with a plurality of cooling drums that can rotate with respect to the cooling and transfer carousel.

Said cooling drums form, about the respective rotation axis, a plurality of accommodation seats for the preforms picked up by the grip elements.

The movement devices are completed by an unloading carousel designed to pick up the cooled preforms from the respective accommodation seats in order to unload them into a magazine or to send them to a feeding line of the blow-molding device.

Although known apparatuses are widely used, they are however not free from drawbacks.

In particular, it is noted that the step of picking up the preforms from the rotating carousel forming device and of subsequently unloading to the cooling and transfer carousel is particularly delicate, since the preforms, due to their high temperature, are subject, in a close sequence, to a pick-up operation and to a release operation by the grip elements and such operations can cause deformation of the still-hot preform.

Moreover, the use of a pick-up carousel and of a cooling carousel increases significantly the dimensions of the apparatus as well as the problems in managing the movement equipment.

The aim of the present invention is to solve the problems and obviate the drawbacks described above, providing an apparatus for manufacturing plastic preforms that allows rendering the preform movement steps particularly reliable.

Within the scope of this aim, an object of the invention is to provide an apparatus for manufacturing plastic preforms that has a reduced number of devices adapted to move the preforms, especially during pick-up from the forming device.

Another object of the invention is to provide an apparatus for manufacturing plastic preforms that is extremely flexible in its management and in the choice of the preform cooling times.

This aim, as well as these and other objects that will become more apparent hereinafter, are achieved by an apparatus for manufacturing plastic preforms according to the provisions of the subsequent claim 1.

Further characteristics and advantages of the invention will become more apparent from the description of some preferred but not exclusive embodiments of an apparatus for manufacturing plastic preforms, illustrated by way of non-limiting example in the accompanying drawings, wherein.

In the examples of embodiment that follow, individual characteristics, given in relation to specific examples, may actually be interchanged with other different characteristics that exist in other examples of embodiment.

Moreover, it is noted that anything found to be already known during the patenting process is understood not to be claimed and to be the subject of a disclaimer.

With reference to the figures cited above, the present invention relates to an apparatus, generally designated by the reference numeral 1, for manufacturing plastic preforms 20 usually used to manufacture containers such as for example bottles.

The apparatus 1 comprises a rotating carousel forming device 2 for plastic preforms 20 and movement means 4 adapted to pick up the preforms 20 from the rotating carousel forming device 2.

The rotating carousel forming device 2 can be of the type adapted to provide the preforms 20 by compression or injection or injection-compression.

According to the present invention, the movement means 4 are associated with a supporting structure 5 for a plurality of shaping receptacles (7a, 7b, etcetera) which are mutually spaced and can move along a transfer path 200.

In particular, the shaping receptacles (7a, 7b, etcetera) are adapted to receive a respective preform 20 directly from the rotating carousel forming device 2 and at an angular pick-up portion 301 that is defined along the circular movement trajectory 300 of the preforms 20 on the rotating carousel forming device 2.

The movement means 4 are, in particular, adapted to allow the engagement of at least one shaping receptacle (7a, 7b, 7c, etcetera) that in each instance is assigned to pick up a respective preform 20 with the rotating carousel forming device 2 along a transfer portion, designated by the numeral 201, said transfer portion 201 being defined along the transfer path 200.

This engagement is achieved conveniently by making the transfer portion 201 of the shaping receptacle (7a, 7b, etcetera) substantially correspond to the angular pick-up portion 301 that corresponds to the angle designated by the reference letter α in the figures.

Advantageously, the supporting structure 5 is connected kinematically to a plurality of transfer drums 6 that are mutually spaced and can move along the transfer path 200.

The transfer drums 6 can rotate, about a respective first rotation axis 100, with respect to the supporting structure 5 and form, about the first rotation axis 100, a plurality of shaping receptacles (7a, 7b, 7c, etcetera) for respective preforms 20 to be transferred.

According to a preferred embodiment, the supporting structure 5 comprises a transfer carousel 8, which can rotate, with respect to a frame, about a second rotation axis 101 that is substantially parallel to the first rotation axes 100 of the transfer drums 6 or in any case substantially parallel to the rotation axis 105 of the rotating carousel forming device 2

Figure 1:
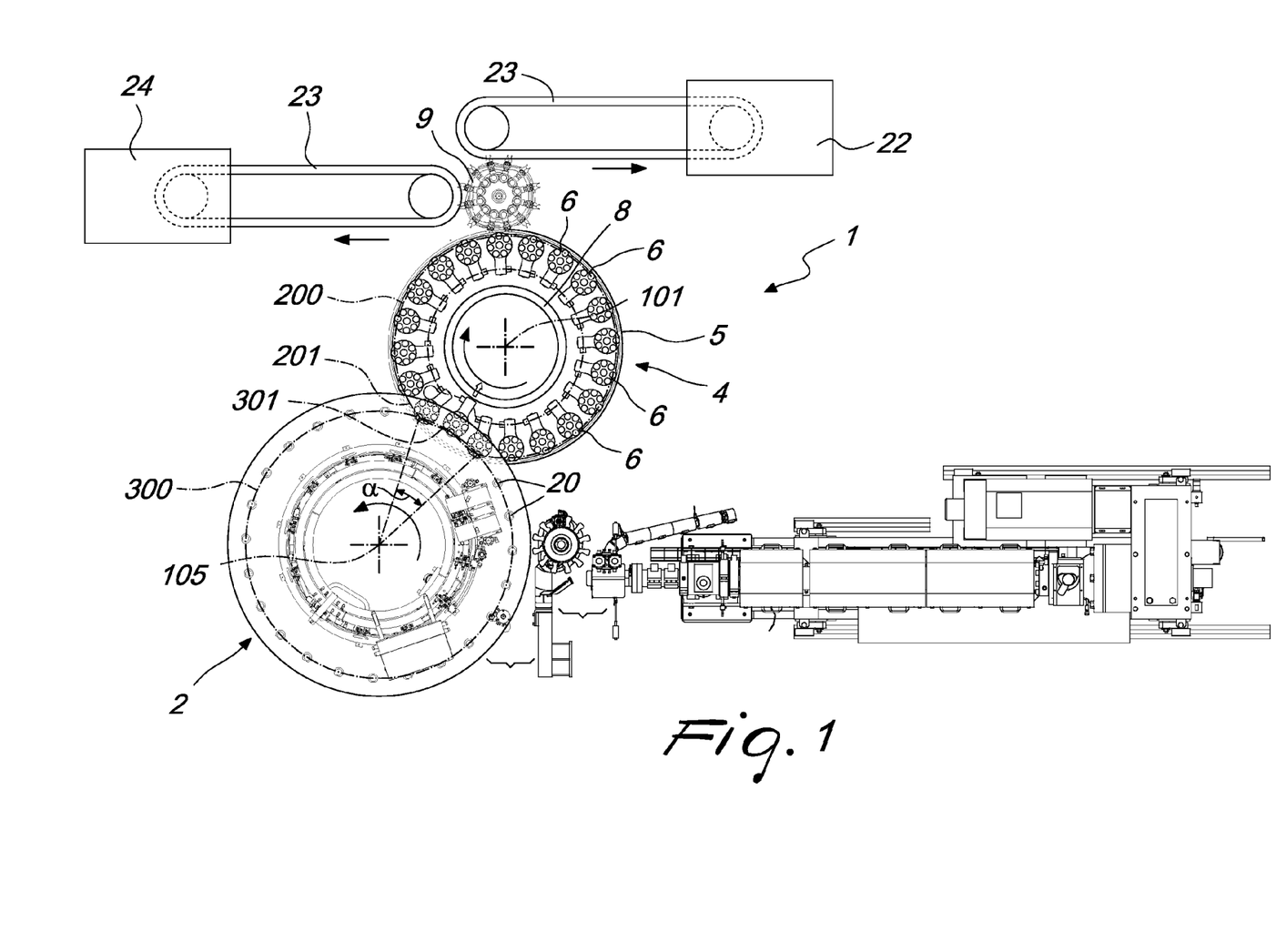
FIG. 1 is a schematic top view of an apparatus for manufacturing plastic preforms.
Figure 2:
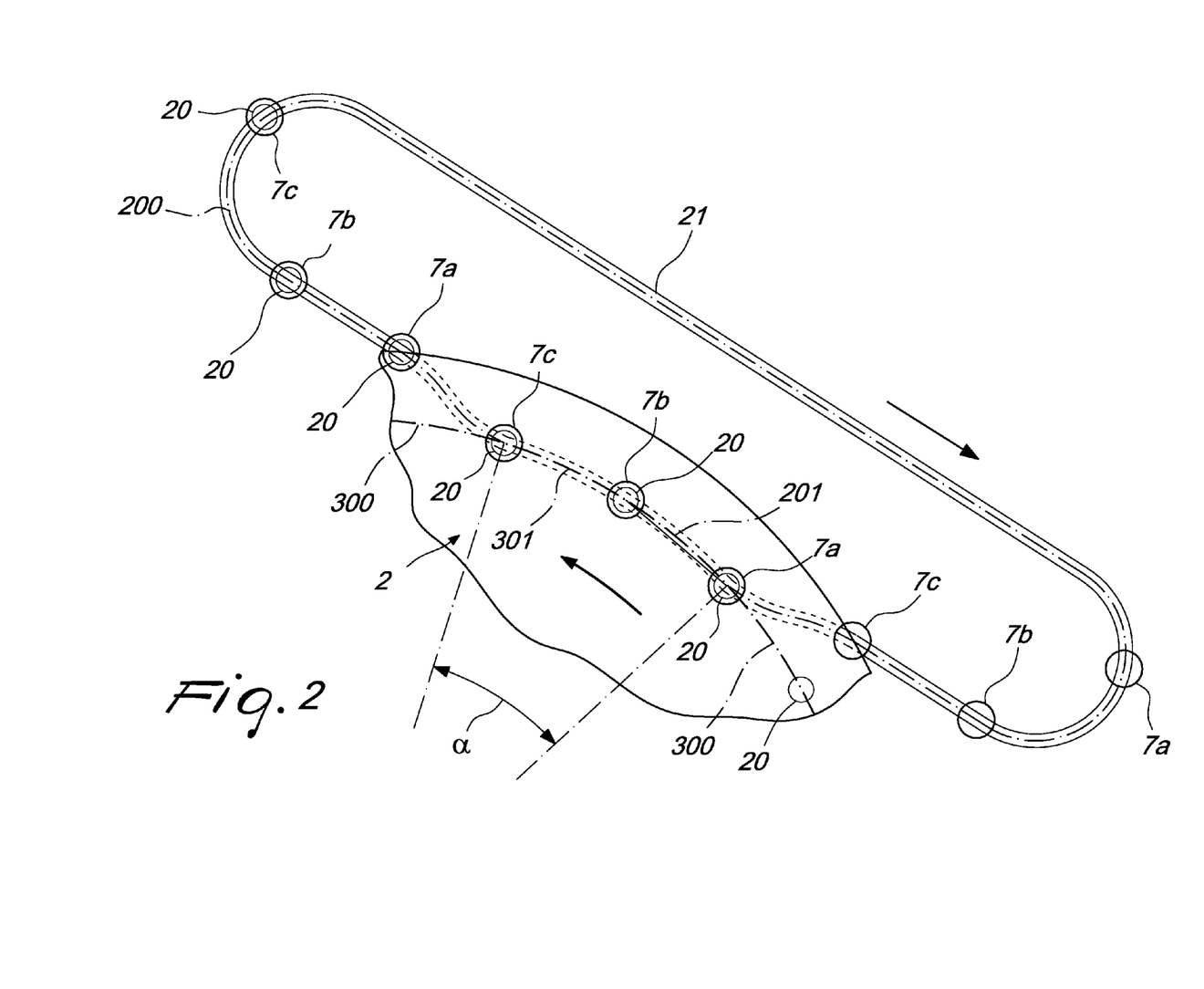
FIG. 2 is an enlarged-scale top view of a first embodiment of the movement means.
Figure 3:
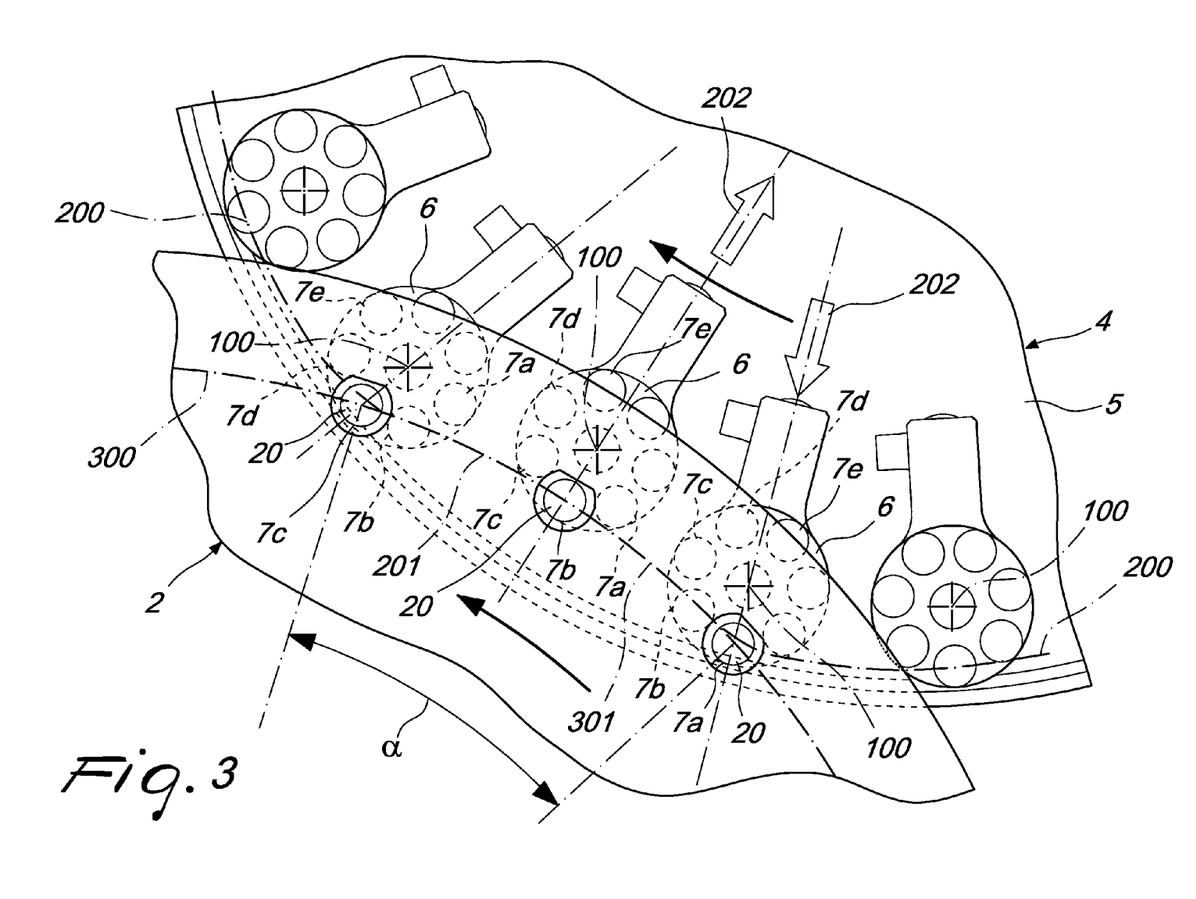
FIGS. 3, 4 and 5 are, again schematically and from above, views of respective constructive variations of the movement means.

However, as shown schematically in FIG. 2, nothing prevents the supporting structure 5 from being associated with a guide or catenary 21 that supports a plurality of shaping receptacles (7a, 7b, etcetera) that are mutually spaced.

The guide or catenary 21 intercepts in particular the circular movement trajectory 300 of the preforms 20 on the rotating carousel forming device 2 at the angular pick-up portion 301.

In this case also, the movement means 4, which can be constituted by the curvilinear extension of said guide or catenary 21, are adapted to move the transfer trajectory 201 of the shaping receptacles (7a, 7b, etcetera) that in each instance are assigned to pick up the preforms 20 so that it coincides with the shape of the angular pick-up portion 301.

In particular, the movement means 4 can be provided by couplings of the "passive" type, for example by ensuring that the supporting structure of the preform 20 intended to be transferred moves the shaping receptacle (7a, 7b, etcetera) intended to receive said preform 20.

However, nothing forbids the movement means from being of the active type, i.e., providing typically cam-type couplings that are conveniently arranged between the frame and the shaping receptacles (7a, 7b, etcetera) or actuation devices, advantageously of the electrically or pneumatically actuated type, which are intended, as described in more detail hereinafter, to actuate the movement of the first rotation axis 100 of the transfer drum 6 and/or the angular movement of the accommodation seat (7a, 7b, 7c, etcetera) that in each instance is intended to pick up a respective preform 20 around the second rotation axis 101, or likewise around a third rotation axis 102 that is parallel to the second rotation axis 101, of the respective transfer drum 6.

In this manner, the transfer portion 201 of the accommodation seat or seats (7a, 7b, 7c, etcetera) is caused to coincide substantially with the trajectory of the preform 20, which, in the embodiment shown in the figures, corresponds, as already specified, to a circular arc that extends around the rotation axis 105 of the rotating carousel forming device 2 subtended to the angle α.

The movement means 4, as already mentioned, can comprise actuation means that operate between the supporting structure 5 and the transfer drums 6 at least along the transfer portion 201.

Said actuation means are adapted to produce a match between the transfer portion 201 of the shaping receptacle (7a, 7b, 7c, etcetera) that in each instance is assigned to pick up a respective preform 20 and the angular pick-up portion 301 of the preform 20 to be picked up from the rotating carousel forming device 2.

According to a preferred embodiment, the actuation means comprise means for the radial movement of the transfer drums 6 with respect to the second rotation axis 101.

Conveniently, the actuation means comprise means for rotating the shaping receptacles (7a, 7b, 7c, etcetera) that in each instance are assigned to pick up a respective preform 20 about the first rotation axis 100 of the respective transfer drum 6 along the transfer portion 201.

More preferably, the rotation of the shaping receptacles (7a, 7b, 7c, etcetera) in each instance assigned to pick up a respective preform 20 along the transfer portion 201 is obtained by means of cam couplings between the transfer drum 6 and the supporting structure 5.

Advantageously, the rotation means are instead activated, on command, in order to cause the rotation (typically equal to the angular distance between two contiguous shaping receptacles) of the shaping receptacles (7a, 7b, 7c, etcetera) about the first rotation axis 100 of the respective transfer drum 6 once the transfer of the preform 20 into the respective shaping receptacle (7a, 7b, 7c, etcetera) has been completed if it is desirable to keep the preforms 20 in the transfer drum 6 for the time required for their cooling.

In this case it is in fact possible to unload, at the subsequent pass of the same transfer drum 6 in engagement with the rotating carousel forming device 2, an additional preform 20 into a shaping receptacle (7a, 7b, 7c, 7d, etcetera) arranged in a contiguous position.

In other applications it is instead possible to unload directly, for example by means of an unloading carousel 9, the still-warm preform 20 from the shaping receptacle (7a, 7b) to transfer it to a blow-molding device 22.

In this case it is not necessary to turn the transfer drum 6.

The radial movement means can be constituted by first motor means that operate between the supporting structure and the transfer drums 6 and can be actuated on command to move mutually closer/further apart, along the direction identified in the figures by the arrows 202, the first rotation axis 100 of the transfer drum 6 moving along the portion 201 from the second rotation axis 101.

Advantageously, the radial movement means can also be provided by cam-like profiles that operate between the frame and the transfer carousel 5 or by cylinders, for example of the pneumatically-actuated type, that operate between the transfer carousel 5 and each transfer drum 6.

The rotation means of the accommodation seat (7a, 7b, 7c, etcetera) in each instance assigned to pick up a respective preform 20 around the first rotation axis 100 of the respective transfer drum 6 along the pick-up portion 201 comprise second motor means constituted for example by respective electrically or pneumatically actuated motors.

Figure 4:
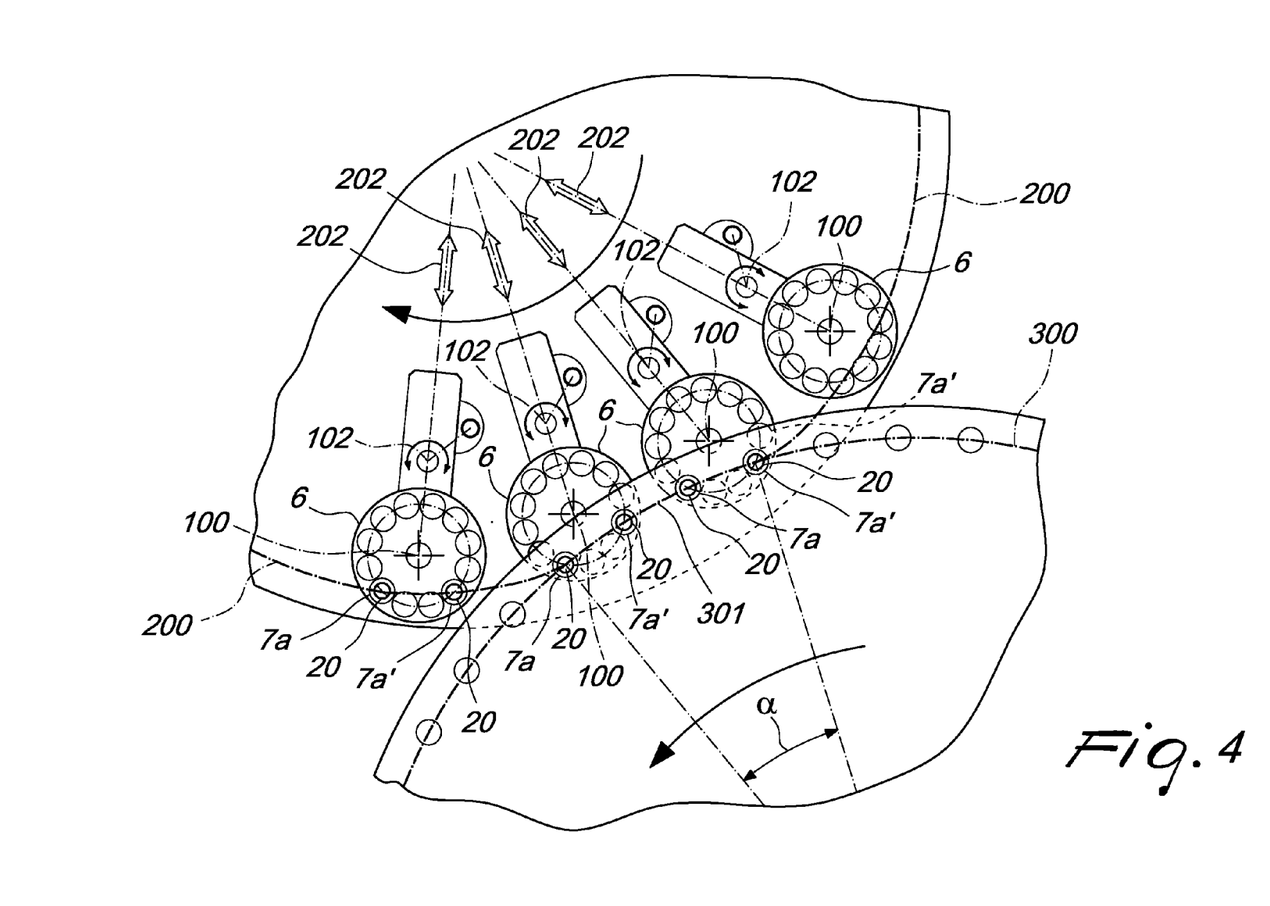
Figure 5:
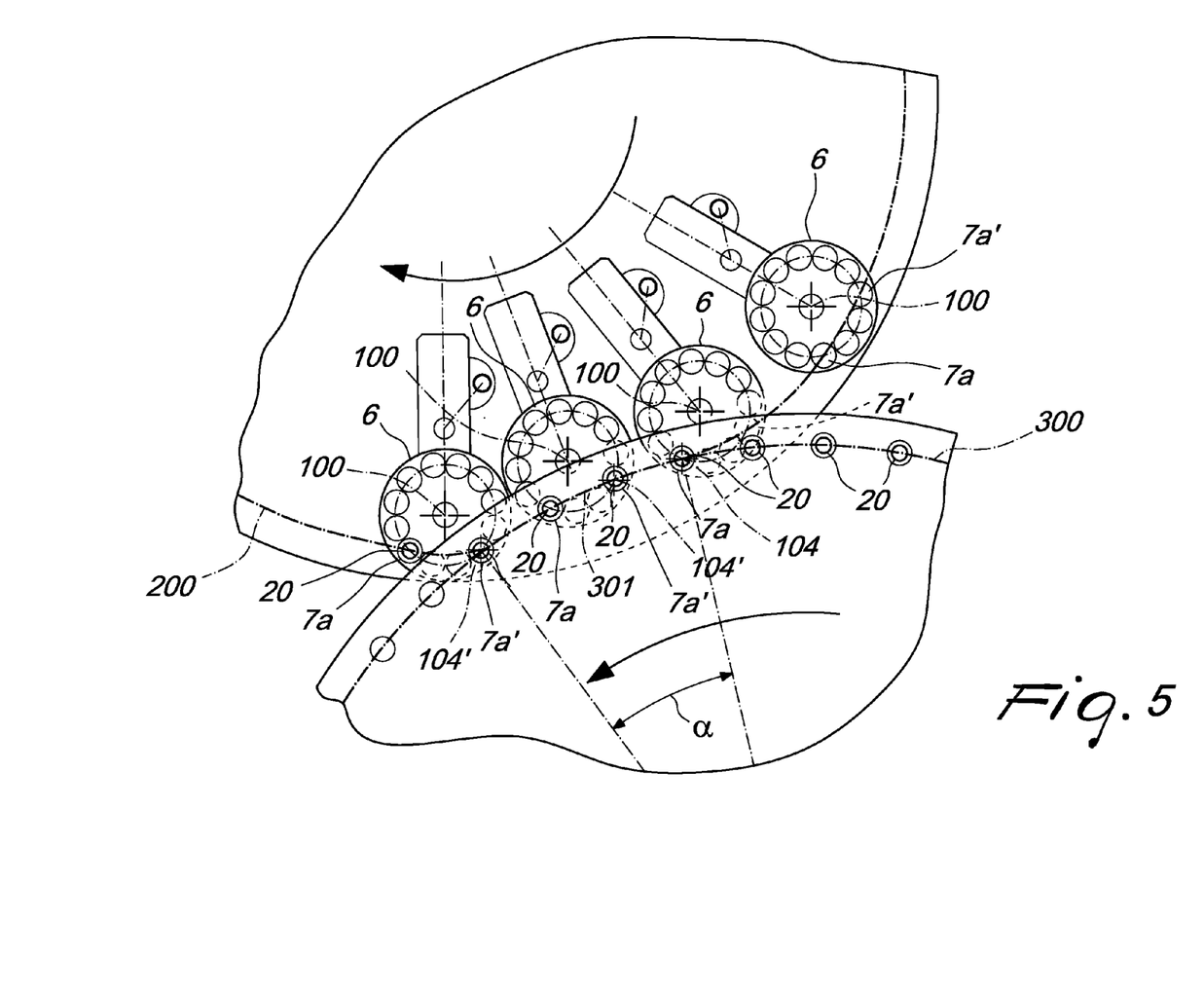
Figure 6:
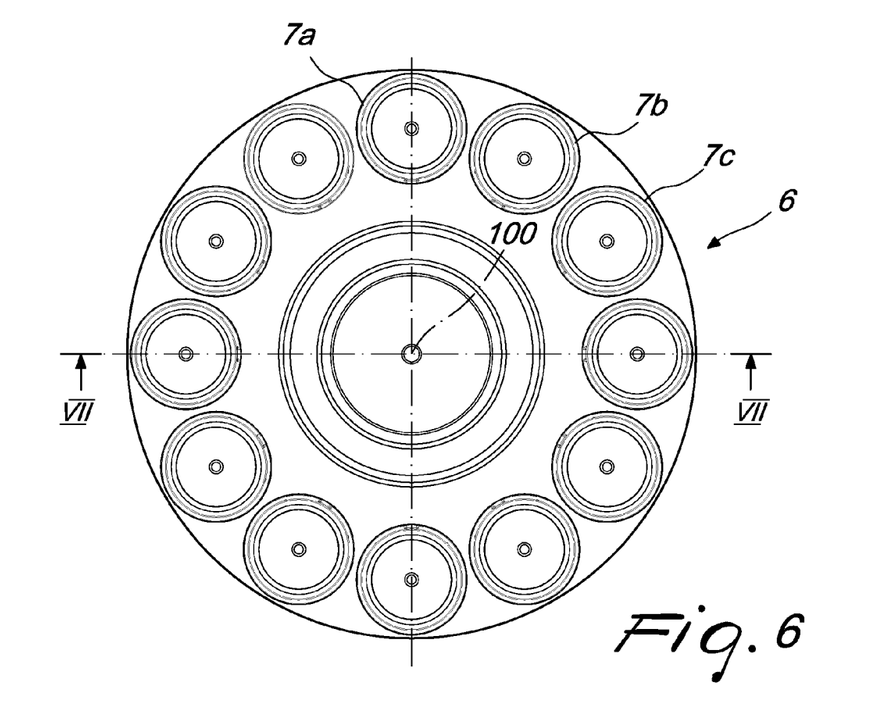
FIG. 6 is a top view of a transfer drum.
Figure 7:
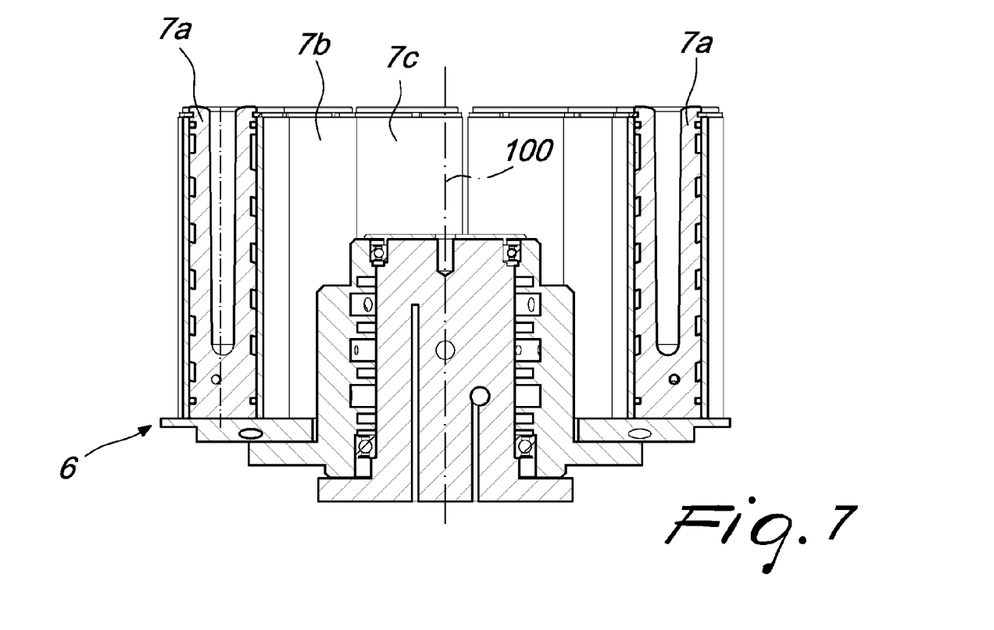
FIG. 7 is a sectional view of the transfer drum along the plane of arrangement defined by the line VII-VII of FIG. 6.
Figure 8:
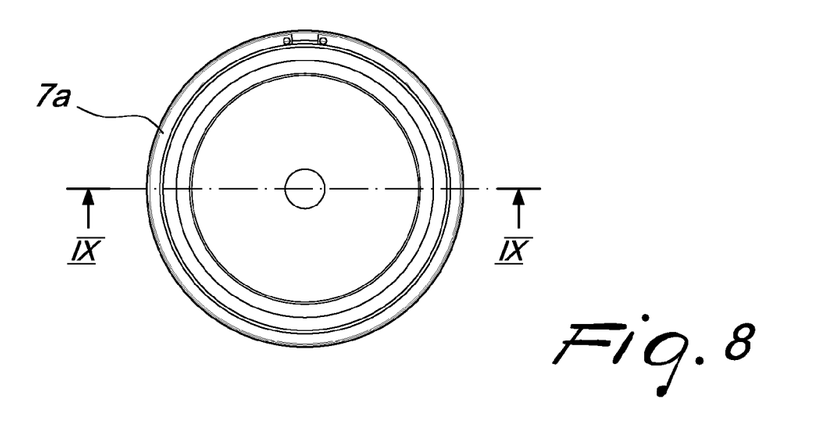
FIG. 8 is a top view of a shaping receptacle.
Figure 9:
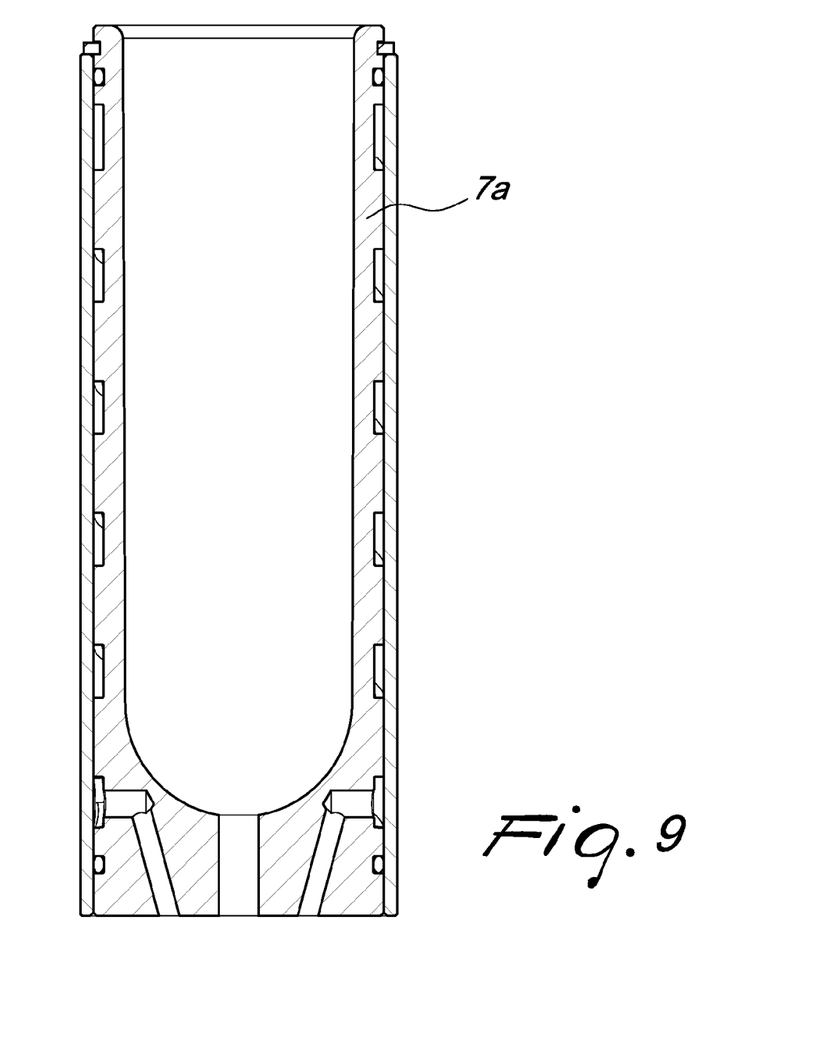
FIG. 9 is a sectional view of the shaping receptacle along the plane of arrangement defined by the line IX-IX of FIG. 8.
Figure 10:
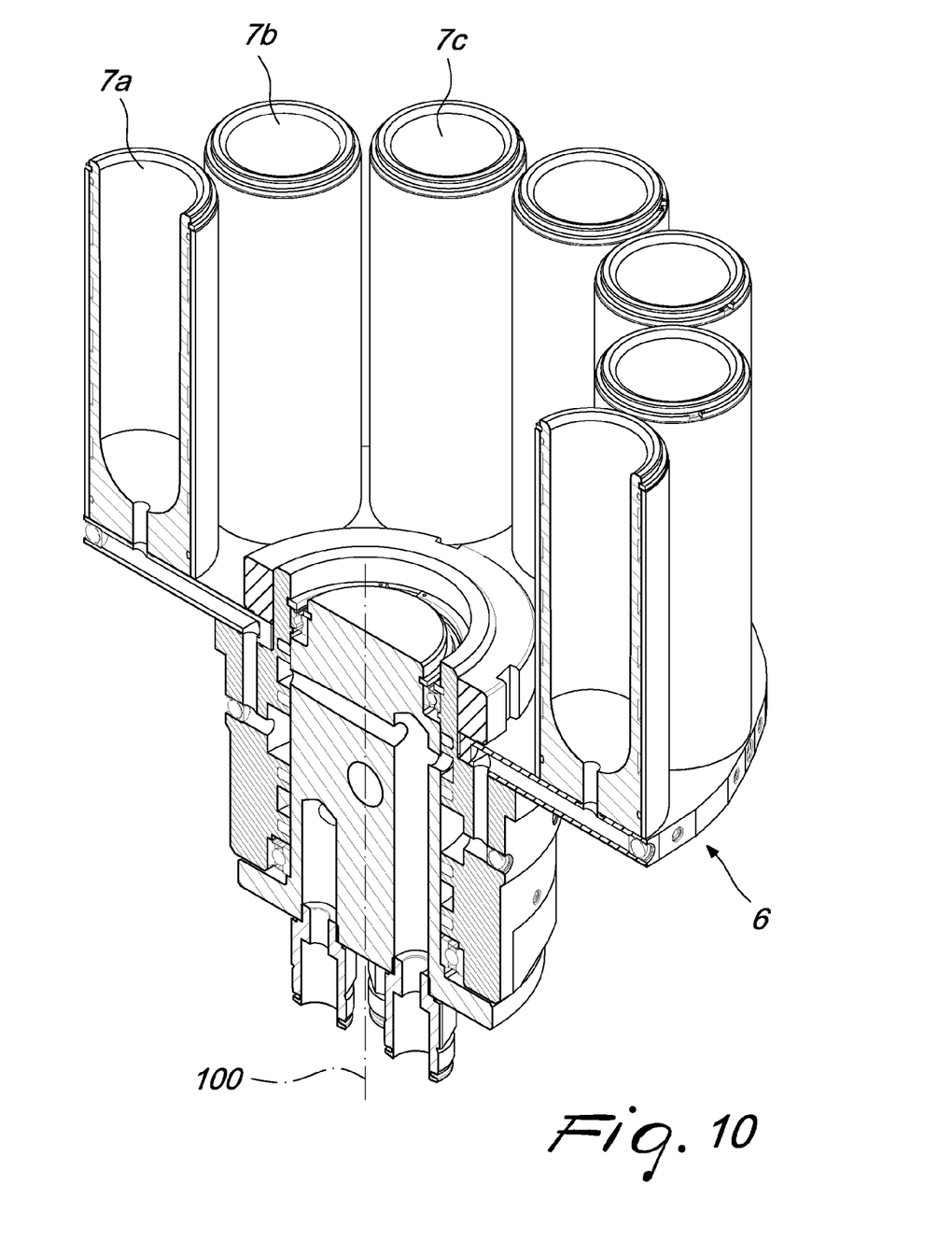
FIG. 10 is a sectional perspective view of a transfer drum.

According to a preferred embodiment, shown in FIGS. 4 and 5, the transfer drums 6 can be adapted to pick up two preforms 20 at each pass at the forming device 2.

In order to achieve this result, as shown in FIG. 4, the transfer drum 6, in addition to being movable radially along the direction 202, might also oscillate about a third pivoting axis 102, which is parallel and spaced with respect to the first pivoting axis 100, so as to be able to arrange substantially simultaneously two different accommodation seats (7a, 7a') at two preforms 20 that pass through the angular pick-up portion 301.

Alternatively, as shown in FIG. 5, the movement means 4 can instead operate on the transfer drum 6 in order to move initially the trajectory of a first shaping receptacle 7a so that it corresponds to the trajectory of a first preform 20.

During the angular movement of the transfer drum 6 along the transfer portion 201, said transfer drum 6 is moved so as to rotate about a fourth pivoting axis 104 that corresponds to the extension of the first preform 20 so that a second shaping receptacle 7a' of the same transfer drum 6 can move its trajectory so that it coincides with the trajectory of an incoming second preform 20.

Once the trajectory of the incoming preform 20 has been "locked" with the trajectory of the second shaping receptacle 7a', the movement means 4 turn the transfer drum 6 about the axis 104', allowing the first shaping receptacle 7a to leave its transfer portion 201.

Once the passage of the incoming preform 22 to the second shaping receptacle 7a' has been completed, said second shaping receptacle 7a' also abandons its transfer portion 201 in order to continue along the transfer path 200.

As is known, among other things, the movement means 4 comprise a carousel 9 for picking up the cooled preforms 20 from the accommodation seats (7a, 7b, 7c, etcetera) in order to provide them conveniently to the blow-molding device 22 or, by means of a bypass, to a storage magazine 23.

According to a further aspect, the present invention relates to an apparatus 1 for manufacturing plastic preforms that comprises a forming device 2, advantageously of the rotating carousel type, for plastic preforms 20 and movement means 4 adapted to pick up the preforms 20 from the forming device 2.

The movement means 4 are associated with a supporting structure 5 that is connected kinematically to a plurality of transfer drums 6.

The transfer drums 6 can rotate about a respective first rotation axis 100 with respect to the supporting structure 5 and form, around the first rotation axis 100, a plurality of accommodation seats (7a, 7b, 7c, etcetera).

The transfer drums 6 and accordingly the accommodation seats (7a, 7b, 7c, etcetera) associated therewith are arranged so as to be mutually spaced and movable along a transfer path 200.

In particular, movement means 4 are provided which operate on the transfer drums 6 and/or on the accommodation seats (7a, 7b, etcetera) formed thereon and are adapted to provide a match between a pick-up portion 301 that is formed along the movement trajectory 300 of the preforms 20 on the forming device 2 and a transfer portion that is formed along the transfer path 200 of the accommodation seats (7a, 7b, etcetera).

Advantageously, the accommodation seats (7a, 7b, etcetera) comprise respective shaping receptacles adapted to receive a respective preform 20 directly from the forming device 2.

Specifically, the movement means 4 are adapted to provide a match between the transfer portion 201 of the accommodation seat (7a, 7b, 7c, etcetera) that in each instance is assigned to pick up a respective preform 20 and the pick-up portion 301 of the preform 20 to be picked up from the forming device 2.

The movement means 4 comprise actuation means that operate between the supporting structure 5 and the transfer drums 6 at least along the transfer portion 201 and are adapted to provide a match between the trajectory of the accommodation seat (7a, 7b, 7c, etcetera) in each instance assigned to pick up a respective preform 20 with said pick-up portion 301.

The actuation means comprise means for the radial movement of the transfer drums 6 with respect to the second rotation axis 101.

The actuation means comprise means for rotating the accommodation seat (7a, 7b, 7c, etcetera) in each instance assigned to pick up a respective preform 20 about the first rotation axis 100 of the respective transfer drum 6 along the transfer portion 201.

The operation of the apparatus 1 for manufacturing plastic containers ensures that the supply device feeds to the rotating carousel forming device 2 respective portions of plastic material from which respective preforms 20 are to be obtained by compression, injection or injection-compression.

These portions are advantageously fed to a lower female mold part, which is moved upward so as to be engaged by a male plunger so as to provide the preforms by compression.

Before the preform reaches the region of engagement with the movement means 4 (moving along the circular movement trajectory 300), the female mold part returns downward, allowing the shaping receptacles (7a, 7b, etcetera), optionally supported by the transfer drums 6, to move below the preform 20 to be transferred.

The movement means 4 operate (actively or passively) on the shaping receptacle (7a, 7b, etcetera) arranged below the preform 20 to be transferred, so that the shaping receptacle (7a, 7b, 7c, etcetera) assigned to receive the preform 20 moves along a transfer portion 201 that is formed on the transfer path 200 and substantially coincides with the angular pick-up portion 301 of the preform 20.

In practice it has been found that the invention has achieved the intended aim and objects in all of the embodiments.

In particular, the direct transfer of the preforms 20 from the rotating carousel forming device 2 to the shaping receptacles (7a, 7b, etcetera) reduces drastically the risk of damaging the still-hot preform.

Furthermore, thanks to the particular structure of the movement means 4, a reduction in the number of carousels involved in the transfer of the preforms has been achieved, with a consequent reduction in the number of passes of hot preforms and an increase in the quality of the finished product.

The apparatus according to the invention has furthermore reduced the inactive times on the product, obtaining, at the same time, greater flexibility in the management of the apparatus as a whole and in particular, thanks to the use of a transfer carousel 8 that is associated, at its peripheral region, with transfer drums, high flexibility in the management of preform cooling times.

Furthermore, with particular reference to the embodiment that provides for the use of the transfer drums 6, considerable time is saved during the format changing steps, since it is possible to change as a single unit the shaping receptacles of each transfer drum 6.

In practice, the dimensions may be any according to the requirements.

All the details may furthermore be replaced with other technically equivalent elements.

The disclosures in Italian Patent Application no. VR2012A000048, from which this application claims priority, are incorporated herein by reference.

The invention claimed is:

1. An apparatus for manufacturing plastic preforms, comprising a rotating carousel forming device for plastic preforms and movement means adapted to pick up said preforms from said rotating carousel forming device, wherein said movement means are associated with a supporting structure for a plurality of shaping receptacles, which are mutually spaced and movable along a transfer path, said shaping receptacles being adapted to receive a respective preform directly from said rotating carousel forming device and at an angular pick-up portion which is defined along the circular movement trajectory of said preforms on said rotating carousel forming device, wherein said supporting structure is connected kinematically to a plurality of transfer drums, said transfer drums being able to rotate about a respective first rotation axis with respect to said supporting structure and defining, around said first rotation axis, a plurality of shaping receptacles.

2. The apparatus for manufacturing plastic preforms according to claim 1, wherein said supporting structure comprises a transfer carousel which can rotate, with respect to a frame, about a second rotation axis which is substantially parallel to said first rotation axis.

3. The apparatus for manufacturing plastic preforms according to claim 1, wherein said movement means are adapted to provide a match between a transfer portion of the shaping receptacle that in each instance is assigned to pick up a respective preform and said angular pick-up portion of the preform to be picked up from said rotating carousel forming device.

4. The apparatus for manufacturing plastic preforms according to claim 2, wherein said movement means comprise actuation means which operate between said supporting structure and said transfer drums at least along said transfer portion and are adapted to produce a match between a trajectory of the shaping receptacle that in each instance is assigned to pick up a respective preform and said angular pick-up portion.

5. The apparatus for manufacturing plastic preforms according to claim 4, wherein said actuation means comprise means for the radial movement of said transfer drums with respect to said second rotation axis.

6. The apparatus for manufacturing plastic preforms according to claim 1, wherein said actuation means comprise means for the rotation of the shaping receptacle that in each instance is assigned to pick up a respective preform about the first rotation axis of the respective transfer drum along said transfer portion.

7. The apparatus for manufacturing plastic preforms according to claim 5, wherein said radial movement means comprise first motor means which operate between said supporting structure and said transfer drums and can be actuated on command to move the first rotation axis of the transfer drum which moves along said transfer portion and said second rotation axis mutually closer/further apart.

8. The apparatus for manufacturing plastic preforms according to claim 6, wherein said means for the rotation of means for the rotation of the shaping receptacle comprise second motor means.

9. The apparatus for manufacturing plastic preforms according to claim 1, wherein said transfer drum is adapted to pick up two preforms at each pass at said rotating carousel forming device.

10. The apparatus for manufacturing plastic preforms according to claim 2, wherein said transfer drum is adapted to oscillate about a third pivoting axis in order to move into engagement, substantially simultaneously, two different shaping receptacles with respective preforms.

11. The apparatus for manufacturing plastic preforms according to claim 2, wherein said movement means comprise a device for moving said transfer drum which is adapted to turn said transfer drum about a fourth pivoting axis which is defined by a first shaping receptacle which engages a first preform in order to move a second shaping receptacle of the same transfer drum into engagement with a second incoming preform.

12. The apparatus for manufacturing plastic preforms according to claim 1, wherein said movement means comprise a carousel for picking up the cooled preforms from said shaping receptacles.

13. An apparatus for manufacturing plastic preforms, comprising a rotating carousel forming device for plastic preforms and movement means adapted to pick up said preforms from said rotating carousel forming device, wherein said movement means are associated with a supporting structure for a plurality of shaping receptacles, which are mutually spaced and movable along a transfer path, said shaping receptacles being adapted to receive a respective preform directly from said rotating carousel forming device and at an angular pick-up portion which is defined along the circular movement trajectory of said preforms on said rotating carousel forming device, wherein said shaping receptacles are associated with a cooling means for said preforms.

14. The apparatus for manufacturing plastic preforms according to claim 1, wherein said rotating carousel forming device is adapted to mold the preforms by compression or injection or by injection-compression.

* * * * *